(12) United States Patent
Sheward et al.

(10) Patent No.: US 12,229,195 B2
(45) Date of Patent: Feb. 18, 2025

(54) METHOD AND APPARATUS FOR KNOWLEDGE REPRESENTATION AND REASONING IN ACCOUNTING

(71) Applicant: PwC Product Sales LLC, New York, NY (US)

(72) Inventors: Paul Sheward, Chicago, IL (US); Chung-Sheng Li, Scarsdale, NY (US); Scott Likens, Austin, TX (US); Saverio Fato, Wilton Manors, FL (US); Joseph Doyle Harrington, Granite Bay, CA (US); Joseph David Voyles, Louisville, KY (US); Jonathan B. Rhine, Suffern, NY (US); Alexander Nicholas Boldizsar, Woodstock, CT (US); Winnie Cheng, West New York, NJ (US); Todd Christopher Morrill, Newburgh, NY (US); Yuan Wan, Irvine, CA (US); William Spotswood Seward, Los Angeles, CA (US)

(73) Assignee: PwC Product Sales LLC, New York, NY (US)

( * ) Notice: Subject to any disclaimer, the term of this patent is extended or adjusted under 35 U.S.C. 154(b) by 0 days.

(21) Appl. No.: 18/181,280

(22) Filed: Mar. 9, 2023

(65) Prior Publication Data

US 2024/0303281 A1  Sep. 12, 2024

(51) Int. Cl.
  *G06F 16/901* (2019.01)
  *G06F 16/903* (2019.01)
  (Continued)

(52) U.S. Cl.
  CPC ........ *G06F 16/906* (2019.01); *G06F 16/9024* (2019.01); *G06F 16/90335* (2019.01);
  (Continued)

(58) Field of Classification Search
  CPC ............... G06F 16/906; G06F 16/9024; G06F 16/90335; G06F 40/295; G06F 40/30; G06N 5/04; G06N 5/12
  (Continued)

(56) References Cited

U.S. PATENT DOCUMENTS

| 10,075,384 | B2 * | 9/2018 | Shear | H04L 47/83 |
| 11,704,285 | B1 * | 7/2023 | Lamar | G06F 16/144 |
| | | | | 707/609 |

(Continued)

OTHER PUBLICATIONS

Apache Software Foundation. (2017) "Apache Solr Reference Guide 7.2, Learning to Rank," located at https://solr.apache.org/guide/7_2/learning-to-rank.html, visited on Nov. 22, 2023. (19 pages).

(Continued)

*Primary Examiner* — Kuen S Lu
(74) *Attorney, Agent, or Firm* — Morrison & Foerster LLP

(57) ABSTRACT

An exemplary system for constructing data structures that can perform inferential reasoning to answer input queries may receive input data, extract and cluster entities in the input data into topic clusters, and for a first topic cluster construct a data structure comprising a plurality of nodes, wherein nodes of the data structure respectively represent a topic entity extracted from the input data and grouped into the first topic cluster, and wherein a first node of the data structure is associated with a second node of the data structure based on the first node and the second node respectively representing a first topic entity and a second topic entity associated in the input data with a common one of the one or more identified linguistic modalities. An exemplary system comprising the data structure may receive an input query and generate a response to the input query using the data structure.

19 Claims, 9 Drawing Sheets

(51) Int. Cl.
*G06F 16/906* (2019.01)
*G06F 40/295* (2020.01)
*G06F 40/30* (2020.01)
*G06N 5/04* (2023.01)
*G06Q 40/12* (2023.01)

(52) U.S. Cl.
CPC ............ *G06F 40/295* (2020.01); *G06F 40/30* (2020.01); *G06N 5/04* (2013.01); *G06Q 40/12* (2013.12)

(58) Field of Classification Search
USPC .......................................................... 707/738
See application file for complete search history.

(56) References Cited

U.S. PATENT DOCUMENTS

| | | | |
|---|---|---|---|
| 2001/0049674 A1* | 12/2001 | Talib | G06Q 10/10 |
| 2004/0068697 A1 | 4/2004 | Harik | |
| 2005/0273336 A1 | 12/2005 | Chang | |
| 2006/0293880 A1 | 12/2006 | Elshishiny | |
| 2010/0153318 A1* | 6/2010 | Branavan | G06F 40/169 706/46 |
| 2011/0238408 A1 | 9/2011 | Larcheveque | |
| 2012/0259856 A1 | 10/2012 | Gehrking | |
| 2016/0103932 A1* | 4/2016 | Sathish | G06N 5/025 715/767 |
| 2020/0320130 A1* | 10/2020 | Korpman | G06F 16/2379 |
| 2022/0345543 A1* | 10/2022 | Oleinikov | G06F 16/313 |

OTHER PUBLICATIONS

Burges. (Jan. 2010). "From RankNet to LambdaRank to LambdaMART: An Overview," Microsoft Research Technical Report MSR-TR-2010-82; pp. 1-19.
International Search Report and Written Opinion mailed Jun. 26, 2023, directed to International Application No. PCT/US2023/064015; 9 pages.
Law. (Feb. 2021). "RankNet, LambdaRank TensorFlow Implementation—Part 1," The Startup; pp. 1-16.
Le. (Nov. 2019). "The ABCs of Learning to Rank," Lucidworks; pp. 1-9.
Motta. (May 2017). "Learning to rank with Python scikit-learn," Towards Data Science; pp. 1-19.
Oliver. (Mar. 2018). "Introduction to Learning to Rank (LTR) Search Analysis," InfoWorld; 3 pages.
Reimers. (2022) "Retrieve and Re-Rank," located at https://www.sbert.net/examples/applications/retrieve_rerank/README.html, visited on Feb. 20, 2023. (4 pages).

* cited by examiner

300

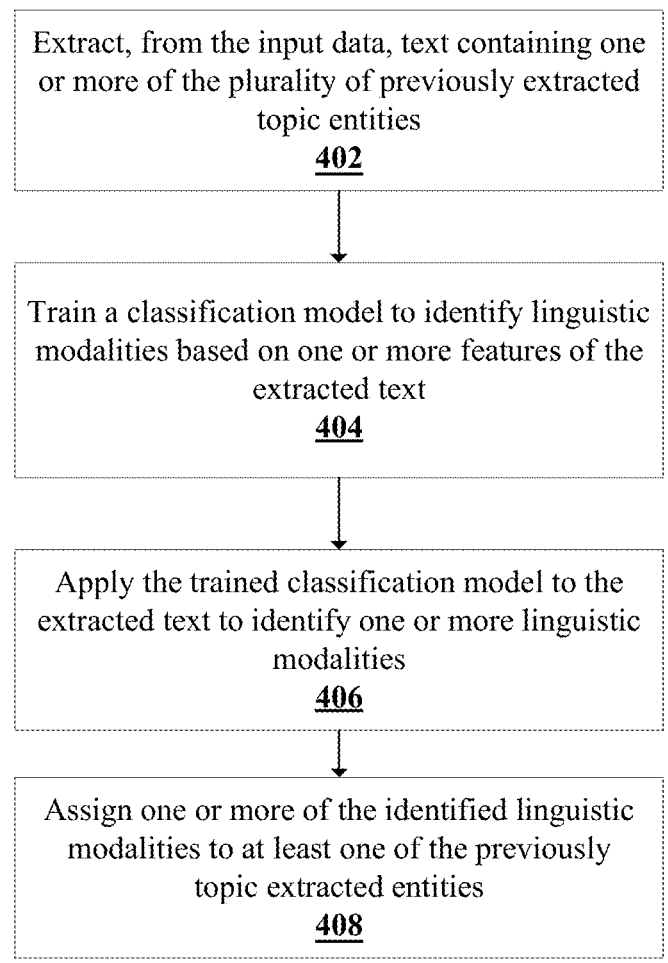

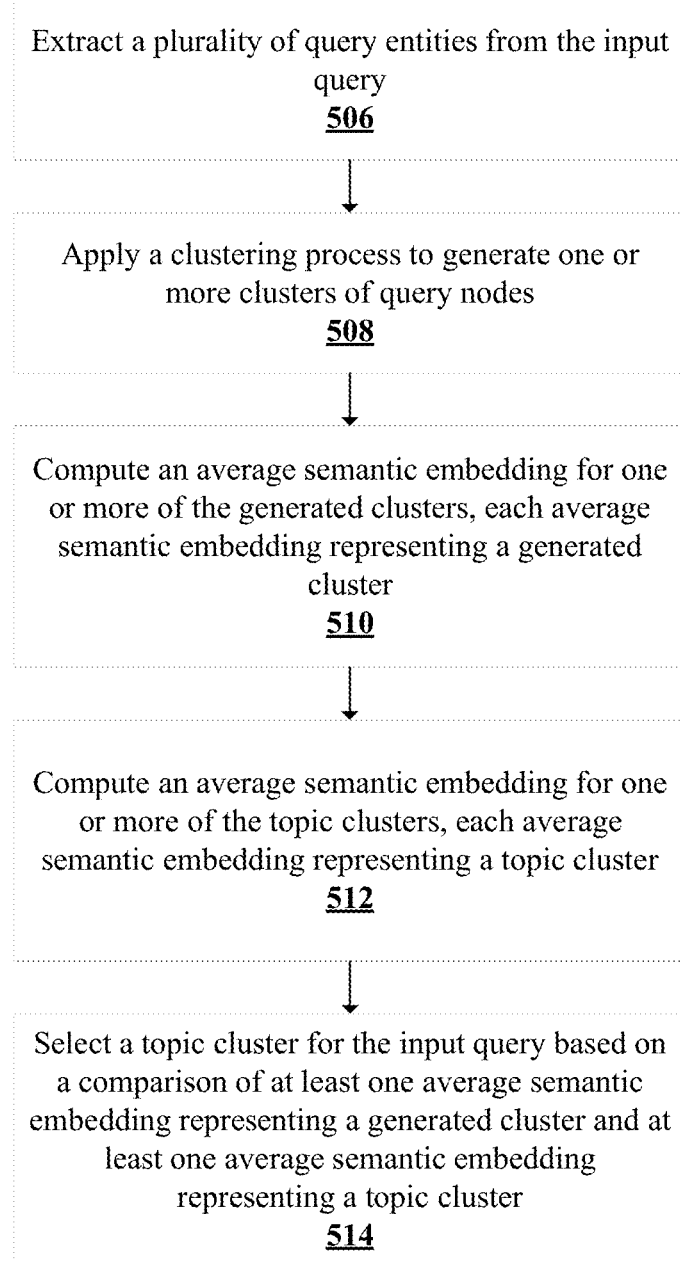

METHOD AND APPARATUS FOR KNOWLEDGE REPRESENTATION AND REASONING IN ACCOUNTING

FIELD

The present disclosure relates generally to fully automated and semi-automated analysis of large datasets and more specifically to methods and systems for constructing knowledge graph empowered question-and-answering knowledge bases that can perform inferential logical reasoning.

BACKGROUND

Existing automated question and answer systems, or systems for automatically processing input questions and generating answers to those questions, are capable of processing definition-type questions. Definition type questions are questions in which the answer can be found directly in the text of a document being processed. However, such systems fail to answer questions requiring logical inference and understanding of context, otherwise known as logical inference type questions.

SUMMARY

There is a need for systems and methods capable of understanding, automatically refining, and answering complex input questions using inferential logical reasoning. Disclosed herein are exemplary devices, apparatuses, systems, methods and non-transitory storage media for performing fully automated and semi-automated analysis on large datasets to construct knowledge graph empowered question-and-answering knowledge bases that can perform inferential logical reasoning to understand, refine, and answer complex questions. As such, exemplary embodiments herein provide a pipeline for extracting specific questions paired with a custom database that can detect question intentions, map the intention to an appropriate section of the database, and generate a response to the input question. The systems and methods disclosed herein leverage knowledge graphs capable of handling inferential logic and common linguistic modalities, for example, within the accounting regulation and compliance domains.

Accordingly, described herein are systems and methods capable of more advanced question and answer processing beyond typical definition-type input question processing and answer generation systems. As noted above, definition-type question input and answer generation algorithms are limited to answers found directly in the text of a document being processed. In contrast, the systems and methods described herein can answer questions that require an understanding of context and logical inference, and direct input questions to a topic-specific map within a custom database used to predict a response to the input question. This capability may be particularly valuable for understanding and answering complex accounting, business, and finance regulation and compliance related questions from users.

A first exemplary system is provided for constructing a data structure, the system comprising one or more processors configured to cause the system to: receive input data; extract a plurality of topic entities from the input data; group one or more topic entities of the plurality of topic entities into one or more topic clusters; identify one or more linguistic modalities associated in the input data with one or more of the plurality of topic entities; and for a first topic cluster of the one or more topic clusters, construct a data structure comprising a plurality of nodes, wherein each node of the data structure respectively represents a topic entity extracted from the input data and grouped into the first topic cluster, and wherein a first node of the data structure is associated with a second node of the data structure based on the first node and the second node respectively representing a first topic entity and a second topic entity associated in the input data with a common one of the one or more identified linguistic modalities.

In some examples of the first system, the input data comprises a natural language input.

In some examples of the first system, the plurality of topic entities comprise accounting keywords in the input data.

In some examples of the first system, the linguistic modalities comprise deontic and/or epistemic linguistic modalities.

In some examples of the first system, the data structure is a knowledge graph.

In some examples of the first system, the one or more processors are configured to cause the system to construct a plurality of data structures, each data structure comprising a respective topic cluster of the one or more topic clusters, wherein each of the nodes of each respective data structure represent a respective topic entity grouped into the respective topic cluster, and wherein nodes within each of the plurality of data structures are interconnected based on the respective topic entities represented by the nodes being associated in the input data with common identified linguistic modalities.

In some examples of the first system, a plurality of nodes in the data structure, in addition to the first node and the second node, are interconnected based on the respective topic entities represented by the plurality of nodes being associated in the input data with common identified linguistic modalities.

In some examples of the first system, a plurality of nodes in each respective data structure are associated with at least one other node of the respective data structure based on the respective nodes having a common identified linguistic modality.

In some examples of the first system, the one or more processors are configured to cause the system to match one or more topic entities in the one or more topic clusters with one or more rules from a rule database based on a relationship between the one or more topic entities and the one or more rules.

In some examples of the first system, the relationship between the one or more topic entities and the one or more rules is determined using one or both of a term frequency inverse document frequency matching process and an average semantic embedding matrix matching process.

In some examples of the first system, the first node of the data structure is associated with the second node of the data structure based on the first node and the second node having been matched to the same rule from the rule database.

In some examples of the first system, the one or more processors are configured to cause the system to automatically generate a response to an input query using a data structure of the plurality of data structures, wherein automatically generating a response to the input query comprises: receiving an input query; automatically identifying a topic cluster associated with the input query based on one or both of a first topic prediction model and second topic prediction model; directing the input query to a data structure of the plurality of data structures associated with the identified topic cluster; and generating a response to the input query based on the data structure comprising the identified topic cluster.

In some examples of the first system, the input query is a natural language input.

In some examples of the first system, the first prediction model is a trained semantic classification model and the second prediction model is a semantic embedding model.

In some examples of the first system, generating a response comprises selecting, based on the data structure comprising the identified topic cluster, a response from a predefined group of responses.

In some examples of the first system, generating a response comprises generating, using the associated nodes of the data structure, a response to the input query.

In some examples of the first system, the generated response comprises a natural language description of an accounting topic.

In some examples of the first system, the generated response comprises a natural language description of a business entity.

In some examples of the first system, the generated response comprises a natural language description of an audit method.

In some examples of the first system, the generated response comprises a natural language explanation of the generated response to the input query.

A first exemplary method is provided for constructing a data structure, the method comprising: receiving input data; extracting a plurality of topic entities from the input data; grouping one or more topic entities of the plurality of topic entities into one or more topic clusters; identifying one or more linguistic modalities associated in the input data with one or more of the plurality of topic entities; and for a first topic cluster of the one or more topic clusters, constructing a data structure comprising a plurality of nodes, wherein each node of the data structure respectively represents a topic entity extracted from the input data and grouped into the first topic cluster, and wherein a first node of the data structure is associated with a second node of the data structure based on the first node and the second node respectively representing a first topic entity and a second topic entity associated in the input data with a common one of the one or more identified linguistic modalities.

In some examples of the first method, the input data comprises a natural language input.

In some examples of the first method, the plurality of topic entities comprise accounting keywords in the input data.

In some examples of the first method, the linguistic modalities comprise deontic and/or epistemic linguistic modalities.

In some examples of the first method, the data structure is a knowledge graph.

In some examples, the first method includes constructing a plurality of data structures, each data structure comprising a respective topic cluster of the one or more topic clusters, wherein each of the nodes of each respective data structure represent a respective topic entity grouped into the respective topic cluster, and wherein nodes within each of the plurality of data structures are interconnected based on the respective topic entities represented by the nodes being associated in the input data with common identified linguistic modalities.

In some examples of the first method, a plurality of nodes in the data structure, in addition to the first node and the second node, are interconnected based on the respective topic entities represented by the plurality of nodes being associated in the input data with common identified linguistic modalities.

In some examples of the first method, a plurality of nodes in each respective data structure are associated with at least one other node of the respective data structure based on the respective nodes having a common identified linguistic modality.

In some examples of the first method, the one or more processors are configured to cause the system to match one or more topic entities in the one or more topic clusters with one or more rules from a rule database based on a relationship between the one or more topic entities and the one or more rules.

In some examples of the first method, the relationship between the one or more topic entities and the one or more rules is determined using one or both of a term frequency inverse document frequency matching process and an average semantic embedding matrix matching process.

In some examples of the first method, the first node of the data structure is associated with the second node of the data structure based on the first node and the second node having been matched to the same rule from the rule database.

In some examples the first method includes automatically generating a response to an input query using a data structure of the plurality of data structures, wherein automatically generating a response to the input query comprises: receiving an input query; automatically identifying a topic cluster associated with the input query based on one or both of a first topic prediction model and second topic prediction model; directing the input query to a data structure of the plurality of data structures associated with the identified topic cluster; and generating a response to the input query based on the data structure comprising the identified topic cluster.

In some examples of the first method, the input query is a natural language input.

In some examples of the first method, the first prediction model is a trained semantic classification model and the second prediction model is a semantic embedding model.

In some examples of the first method, generating a response comprises selecting, based on the data structure comprising the identified topic cluster, a response from a predefined group of responses.

In some examples of the first method, generating a response comprises generating, using the associated nodes of the data structure, a response to the input query.

In some examples of the first method, the generated response comprises a natural language description of an accounting topic.

In some examples of the first method, the generated response comprises a natural language description of a business entity.

In some examples of the first method, the generated response comprises a natural language description of an audit method.

In some examples of the first method, the generated response comprises a natural language explanation of the generated response to the input query.

A first exemplary non-transitory computer readable storage medium storing one or more programs is provided, the one or more programs comprising instructions, which when executed by one or more processors of an electronic device, cause the electronic device to: receive input data; extract a plurality of topic entities from the input data; group one or more topic entities of the plurality of topic entities into one or more topic clusters; identify one or more linguistic modalities associated in the input data with one or more of the plurality of topic entities; and for a first topic cluster of the one or more topic clusters, construct a data structure comprising a plurality of nodes, wherein each node of the data structure respectively represents a topic entity extracted from the input data and grouped into the first topic cluster, and wherein a first node of the data structure is associated with a second node of the data structure based on the first node and the second node respectively representing a first topic entity and a second topic entity associated in the input data with a common one of the one or more identified linguistic modalities.

In some examples of the first non-transitory computer readable storage medium, the input data comprises a natural language input.

In some examples of the first non-transitory computer readable storage medium, the plurality of topic entities comprise accounting keywords in the input data.

In some examples of the first non-transitory computer readable storage medium, the linguistic modalities comprise deontic and/or epistemic linguistic modalities.

In some examples of the first non-transitory computer readable storage medium, the data structure is a knowledge graph.

In some examples non-transitory computer readable storage medium, the instructions, when executed by the one or more processors of the electronic device, cause the electronic device to construct a plurality of data structures, each data structure comprising a respective topic cluster of the one or more topic clusters, wherein each of the nodes of each respective data structure represent a respective topic entity grouped into the respective topic cluster, and wherein nodes within each of the plurality of data structures are interconnected based on the respective topic entities represented by the nodes being associated in the input data with common identified linguistic modalities.

In some examples of the first non-transitory computer readable storage medium, a plurality of nodes in the data structure, in addition to the first node and the second node, are interconnected based on the respective topic entities represented by the plurality of nodes being associated in the input data with common identified linguistic modalities.

In some examples of the first non-transitory computer readable storage medium, a plurality of nodes in each respective data structure are associated with at least one other node of the respective data structure based on the respective nodes having a common identified linguistic modality.

In some examples of the first non-transitory computer readable storage medium, the instructions, when executed by the one or more processors of the electronic device, cause the electronic device to match one or more topic entities in the one or more topic clusters with one or more rules from a rule database based on a relationship between the one or more topic entities and the one or more rules.

In some examples of the first non-transitory computer readable storage medium, the relationship between the one or more topic entities and the one or more rules is determined using one or both of a term frequency inverse document frequency matching process and an average semantic embedding matrix matching process.

In some examples of the first non-transitory computer readable storage medium, the first node of the data structure is associated with the second node of the data structure based on the first node and the second node having been matched to the same rule from the rule database.

In some examples of the first non-transitory computer readable storage medium, the instructions, when executed by the one or more processors of the electronic device, cause the electronic device to automatically generate a response to an input query using a data structure of the plurality of data structures, wherein automatically generating a response to the input query comprises: receiving an input query; automatically identifying a topic cluster associated with the input query based on one or both of a first topic prediction model and second topic prediction model; directing the input query to a data structure of the plurality of data structures associated with the identified topic cluster; and generating a response to the input query based on the data structure comprising the identified topic cluster.

In some examples of the first non-transitory computer readable storage medium, the input query is a natural language input.

In some examples of the first non-transitory computer readable storage medium, the first prediction model is a trained semantic classification model and the second prediction model is a semantic embedding model.

In some examples of the first non-transitory computer readable storage medium, generating a response comprises selecting, based on the data structure comprising the identified topic cluster, a response from a predefined group of responses.

In some examples of the first non-transitory computer readable storage medium, generating a response comprises generating, using the associated nodes of the data structure, a response to the input query.

In some examples of the first non-transitory computer readable storage medium, the generated response comprises a natural language description of an accounting topic.

In some examples of the first non-transitory computer readable storage medium, the generated response comprises a natural language description of a business entity.

In some examples of the first non-transitory computer readable storage medium, the generated response comprises a natural language description of an audit method.

In some examples of the first non-transitory computer readable storage medium, the generated response comprises a natural language explanation of the generated response to the input query.

A second exemplary system is provided for automatically determining a response to an input query, the system comprising one or more processors configured to cause the system to: receive, by the system, an input query; automatically identify a topic cluster associated with the input query based on one or both of a first topic prediction model and second topic prediction model, wherein the topic cluster comprises a plurality of topic entities; direct the input query to a data structure associated with the identified topic cluster, wherein the data structure comprises a plurality of nodes, each node representing one of the topic entities in the topic cluster, and wherein at least one of the nodes in the topic cluster is associated with one or more of the other nodes in the topic cluster based on one or more linguistic modalities, the linguistic modalities defining a relationship linking the respective nodes; and generate a response to the input query.

In some examples of the second system, the input query is a natural language input.

In some examples of the second system, the first prediction model is a trained semantic classification model and the second prediction model is a semantic embedding model.

In some examples of the second system, generating a response comprises selecting, based on the data structure comprising the identified topic cluster, a response from a predefined group of responses.

In some examples of the second system, generating a response comprises generating, using the associated nodes of the data structure, a response to the input query.

In some examples of the second system, the generated response comprises a natural language description of an accounting topic.

In some examples of the second system, the generated response comprises a natural language description of a business entity.

In some examples of the second system, the generated response comprises a natural language description of an audit method.

In some examples of the second system, the generated response comprises a natural language explanation of the generated response to the input query.

A second exemplary method for automatically determining a response to an input query comprises: receiving, by a computer, an input query; automatically identifying a topic cluster associated with the input query based on one or both of a first topic prediction model and second topic prediction model, wherein the topic cluster comprises a plurality of topic entities; directing the input query to a data structure associated with the identified topic cluster, wherein the data structure comprises a plurality of nodes, each node representing one of the topic entities in the topic cluster, and wherein at least one of the nodes in the topic cluster is associated with one or more of the other nodes in the topic cluster based on one or more linguistic modalities, the linguistic modalities defining a relationship linking the respective nodes; and generating a response to the input query.

In some examples of the second method, the input query is a natural language input.

In some examples of the second method, the first prediction model is a trained semantic classification model and the second prediction model is a semantic embedding model.

In some examples of the second method, generating a response comprises selecting, based on the data structure comprising the identified topic cluster, a response from a predefined group of responses.

In some examples of the second method, generating a response comprises generating, using the associated nodes of the data structure, a response to the input query.

In some examples of the second method, the generated response comprises a natural language description of an accounting topic.

In some examples of the second method, the generated response comprises a natural language description of a business entity.

In some examples of the second method, the generated response comprises a natural language description of an audit method.

In some examples of the second method, the generated response comprises a natural language explanation of the generated response to the input query.

A second exemplary non-transitory computer readable storage medium storing one or more programs is provided, the one or more programs comprising instructions, which when executed by one or more processors of an electronic device, cause the electronic device to: receive an input query; automatically identify a topic cluster associated with the input query based on one or both of a first topic prediction model and second topic prediction model, wherein the topic cluster comprises a plurality of topic entities; direct the input query to a data structure associated with the identified topic cluster, wherein the data structure comprises a plurality of nodes, each node representing one of the topic entities in the topic cluster, and wherein at least one of the nodes in the topic cluster is associated with one or more of the other nodes in the topic cluster based on one or more linguistic modalities, the linguistic modalities defining a relationship linking the respective nodes; and generate a response to the input query.

In some examples of the second non-transitory computer readable storage medium, the input query is a natural language input.

In some examples of the second non-transitory computer readable storage medium, the first prediction model is a trained semantic classification model and the second prediction model is a semantic embedding model.

In some examples of the second non-transitory computer readable storage medium, generating a response comprises selecting, based on the data structure comprising the identified topic cluster, a response from a predefined group of responses.

In some examples of the second non-transitory computer readable storage medium, generating a response comprises generating, using the associated nodes of the data structure, a response to the input query.

In some examples of the second non-transitory computer readable storage medium, the generated response comprises a natural language description of an accounting topic.

In some examples of the second non-transitory computer readable storage medium, the generated response comprises a natural language description of a business entity.

In some examples of the second non-transitory computer readable storage medium, the generated response comprises a natural language description of an audit method.

In some examples of the second non-transitory computer readable storage medium, the generated response comprises a natural language explanation of the generated response to the input query.

BRIEF DESCRIPTION OF THE FIGURES

FIG. 4 illustrates an exemplary method for identifying linguistic modalities and assigning linguistic modalities to topic entities in a topic cluster.

FIG. 5B illustrates an additional exemplary method for intention detection and result prediction.

DETAILED DESCRIPTION

Figure 1:
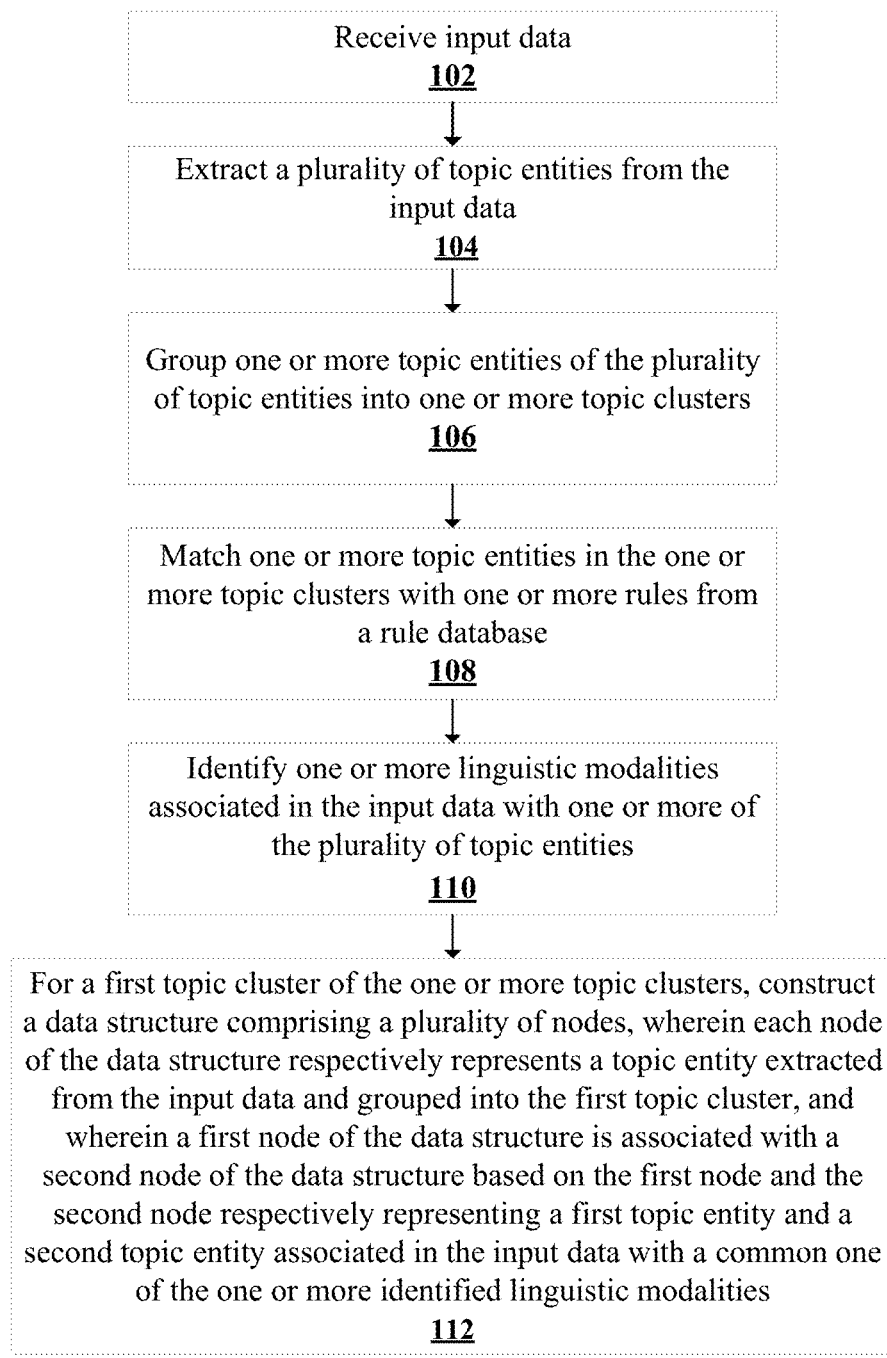
FIG. 1 illustrates an exemplary method for constructing a data structure.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including,""comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown but are accorded the scope consistent with the claims.

Disclosed herein are exemplary devices, apparatuses, systems, methods, and non-transitory storage media for performing fully automated and semi-automated analysis on large datasets to construct knowledge graph empowered question-and-answering knowledge bases that can perform inferential logic reasoning to understand and refine and answer complex questions. An exemplary system is provided for constructing a data structure, the system comprising one or more processors configured to cause the system to: receive input data; extract a plurality of topic entities from the input data; group the one or more topic entities into one or more topic clusters; identify and extract one or more linguistic modalities associated with the one or more topic entities extracted from the input data; and construct a data structure comprising a first topic cluster of the one or more topic clusters, wherein the nodes of the data structure represent one or more topic entities grouped into the first topic cluster, and wherein a first node of the data structure is associated with a second node of the data structure based on the first node and the second node having a common identified linguistic modality.

Accordingly, described herein are systems and methods capable of advanced question and answer processing beyond typical definition-type input question processing and answer generation systems. As noted above, definition-type question input and answer generation algorithms are limited to answers found directly in the text of a document being processed. In contrast, the systems and methods described herein can answer questions that require an understanding of context and logical inference, and direct input questions to a topic-specific map within a custom database used to predict a response to the input question. This capability may be particularly valuable for understanding and answering complex accounting, business, and finance regulation and compliance related questions from users.

FIG. 1 depicts an illustrative method 100 for knowledge representation and reasoning in accordance with examples provided herein. Method 100 is performed, for example, using one or more electronic devices implementing a software platform. In method 100, some blocks are, optionally, combined, the order of some blocks is, optionally, changed, and some blocks are, optionally, omitted. In some examples, additional steps may be performed in combination with the method 100. Accordingly, the operations as illustrated (and described in greater detail below) are exemplary by nature and, as such, should not be viewed as limiting.

Figure 7:
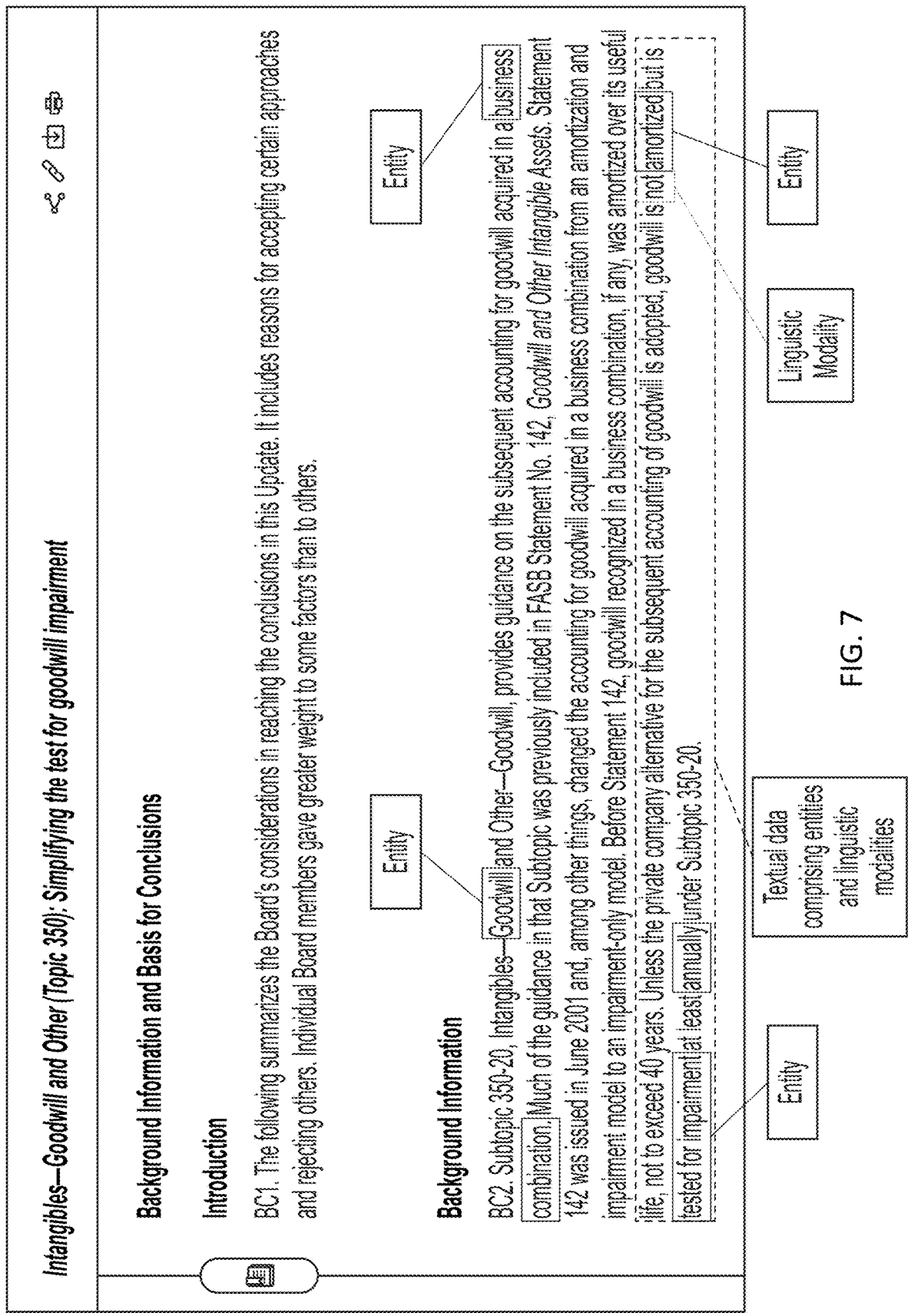
FIG. 7 illustrates exemplary input data for use in constructing a data structure.

In some examples, method 100 can begin at step 102, wherein step 102 comprises receiving input data. The input data may include one or more files or documents comprising textual data. The textual data may include a plurality of entities (e.g., words, phrases, numbers, etc.). The input data may be in the form of a natural language input. The input data may comprise structured and/or unstructured textual data. Exemplary input data in the form of a text file is illustrated in FIG. 7. The exemplary input data in FIG. 7 is annotated to show entities and linguistic modalities important to the exemplary embodiments of the methods and systems described throughout.

In some examples, after receiving input data at step 102, the method 100 can proceed to step 104, wherein step 104 comprises extracting a plurality of topic entities from the input data. In some examples, the topic entities are extracted using one or more trained language models. The models may be Named Entity Recognition (NER) models trained using a set of accounting terms (for instance from a library such as SpaCy, Flair etc.). In some examples, if more training data is needed, GPT3 may be used to automatically generate additional specialized training data. In some examples, the one or more language models used for entity extraction are re-trained using the extracted entities. In some examples, extracting the plurality of topic entities may include applying a linguistic filtering process to a plurality of entities extracted from the input data to extract a plurality of topic entities from the plurality of extracted entities. The linguistic filtering process may remove noise (e.g. filler words such as "a" or "the" or other irrelevant words and phrases) from the extracted entities, correct typographical errors, automatically identify synonyms of the extracted entities, and/or correct spelling errors. In some examples, the filtering process may be performed automatically according to a linguistic filtering algorithm. In some examples, the linguistic filtering process may be performed or augmented by a human operator. In some examples, the topic entities may be key terms or phrases related to business or accounting concepts. For instance, FIG. 7 depicts exemplary topic entities "goodwill,""business combination,""annually," and "tested for impairment" that may be extracted from unstructured textual data.

Figure 3:
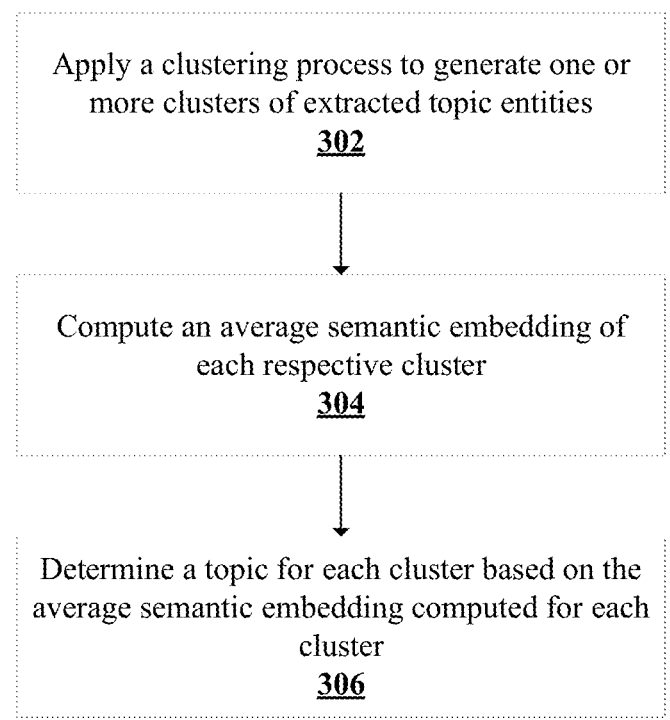
FIG. 3 illustrates an exemplary method for performing topic modeling.

In some examples, after extracting a plurality of topic entities from the input data at step 104, the method can proceed to step 106, wherein step 106 comprises grouping the one or more topic entities into one or more topic clusters. In some examples, grouping the one or more topic entities into one or more topic clusters may be done in accordance with the method 300 illustrated in FIG. 3. The method 300 may begin at step 302 wherein step 302 comprises applying a clustering process to the one or more topic entities extracted at step 104 of method 100 to group the one or more topic entities into one or more clusters.

After grouping the one or more topic entities into one or more clusters at step 302, the method 300 may proceed to step 304, wherein step 304 comprises computing an average semantic embedding of each respective cluster. After computing an average semantic embedding for each respective cluster at step 304, the method 300 can proceed to step 306, wherein step 306 comprises assigning a topic to each cluster of topic entities based on the average semantic embedding computed for each cluster. In some examples, each resulting topic cluster may include a plurality of topic entities associated with an accounting or business topic. For instance, in accordance with the exemplary input data depicted in FIG. 7, a topic of "business combination and intangible asset valuation" may be assigned to an exemplary topic cluster comprising topic entities "goodwill,""amortization,""test for impairment," and "annually." In some examples, the one or more topic entities may instead be grouped into one or more predefined topic clusters. In some examples, topics may instead be assigned to each respective topic cluster of topic entities manually by a human.

Returning to the method 100 depicted in FIG. 1, after grouping the one or more topic entities into one or more topic clusters, the method may proceed to step 108, wherein step 108 comprises matching topic entities from one or more of the one or more topic clusters to one or more rules from a database of rules. In some examples, matching topic entities from one or more topic clusters to one or more rules from a database of rules may include determining a relationship between topic entities in a topic cluster of the one or more topic clusters and one or more rules from the rule database, and matching, based on the determined one or more relationships, the topic entities in the topic cluster to at least one rule of the one or more rules. For instance, a topic cluster may comprise topic entities "goodwill" and "amortization," and a rule from the rule database may state "goodwill is not amortized." As such, a relationship between the respective topic entities in the topic cluster and the rule may be determined based on the rule also containing entities "goodwill" and "amortization." Based on the determined relationship, the rule may be matched with the topic entities in the topic cluster by extracting the relation "NOT" from the rule "goodwill is not amortized" to link the topic entities "goodwill" and "amortized" within the topic cluster.

In some examples, the relationship may be determined using one or both of a term frequency inverse document frequency (TF-IDF) keyword matching process or an average semantic embedding matching process. In some examples the term frequency inverse document frequency matching process may be performed before, after, or simultaneously with the average semantic embedding process. The results of both the term frequency inverse document frequency matching process and the average semantic embedding process may be used in combination to determine a final matching between the rules and topic entities in the topic clusters. As such, matching rules from a rule database to topic entities in the topic clusters may be an ensemble matching process based on both a TF-IDF matching process between topic entities in the topic clusters and one or more rules from the rule database and one or more semantic embedding matching processes between the topic entities in the topic clusters and the one or more rules from the rule database. As noted above and described further below, the rules matched to topic entities in each respective topic cluster may form connections (edges) linking nodes in a data structure comprising a topic cluster of the one or more topic clusters, wherein the nodes of the data structure each represent a respective topic entity clustered into the respective topic cluster. The above description of matching topic entities extracted from input data to rules from a rule database is meant to be exemplary, and one skilled in the art would understand that other matching processes exist for assigning rules from a rule database to entities extracted from input data thus forming edges of a data structure/knowledge graph that remain within the scope of the claims set forth herein.

Returning to the method depicted in FIG. 1, after matching topic entities in the one or more topic clusters to one or more rules from a database of rules at step 108, the method 100 may proceed to step 110, wherein step 110 identifying one or more linguistic modalities associated in the input data with one or more of the plurality of topic entities. In some examples identifying one or more linguistic modalities comprises applying a trained classification model to the input data. The trained classification model may be used to identify one or more relationships between the one or more previously extracted topic entities in the input data.

In some examples identifying one or more linguistic modalities associated in the input data with one or more of the plurality of topic entities may be accomplished in accordance with the method 400 illustrated in FIG. 4. The method 400 may begin at step 402, wherein step 402 includes extracting, from the input data, text containing one or more of the previously extracted topic entities (e.g., sentences from the input data containing the previously extracted topic entities). After extracting text from the input file at step 402, the method 400 may proceed to step 404, wherein step 404 includes training a classification model to identify linguistic modalities based on one or more features of the extracted text.

In some examples, after training the classification model at step 404, the method 400 may proceed to step 406, wherein step 406 includes applying a trained classification model to the extracted text containing the previously extracted topic entities to identify one or more linguistic modalities in the text. As noted above, the one or more linguistic modalities may be deontic and/or epistemic linguistic modalities. The identified linguistic modalities may be associated in the input data with one or more of the plurality of topic entities, for instance defining a relationship between one or more entities in the input data. For instance, the exemplary input data illustrated in FIG. 7 depicts textual data containing entities "goodwill,""amortization," "tested for impairment," and "annually." As depicted in FIG. 7, the linguistic modality "not" is provided between entities "goodwill" and "amortized." As such, the trained classifier may identify "not" as a linguistic modality in the extracted text including entities "goodwill" and "amortized." The above description of assigning linguistic modalities to topic entities is meant to be exemplary, and one skilled in the art would understand that other processes exist for assigning linguistic modalities from input data to entities in the input data thus forming edges of a data structure/knowledge graph that remain within the scope of the claims set forth herein. For instance, the classification model may be applied directly to the input data rather than to text (e.g., sentences) extracted from the input data.

After identifying one or more linguistic modalities at step 406, the method 400 may proceed to step 408, wherein step 408 includes assigning one or more of the identified linguistic modalities to at least one of the extracted topic entities in a topic cluster of the one or more topic clusters. For instance, the linguistic modality "not" may be assigned to both topic entities "goodwill" and "amortized" thus defining a relationship between the topic entities within a respective topic cluster. As described further below with reference to step 112 of the method 100, assigning the linguistic modality to the two topic entities forms an edge linking two nodes representing topic entities "goodwill" and "amortization" within a data structure comprising the respective topic cluster. In other words, two nodes, a first representing extracted topic entity "goodwill" and a second representing extracted topic entity "amortization" may be linked by the linguistic modality "not" within a data structure to represent that goodwill is not amortized.

Returning to FIG. 1, after identifying one or more linguistic modalities associated with in the input data with one or more of the plurality of topic entities step 110, the method 100 may proceed to step 112, wherein step 112 includes, for a first topic cluster of the one or more topic clusters, construct a data structure comprising a plurality of nodes, wherein each node of the data structure respectively represents a topic entity extracted from the input data and grouped into the first topic cluster, and wherein a first node of the data structure is associated with a second node of the data structure based on the first node and the second node respectively representing a first topic entity and a second topic entity associated in the input data with a common one of the one or more identified linguistic modalities In some examples, the method 100 includes constructing a plurality of data structures, wherein each of the data structures comprises one of the one or more topic clusters. In some examples, each respective topic cluster comprises a plurality of topic entities extracted from the input data. In some examples, the each of the nodes of each respective data structure represent a respective topic entity included in the respective topic cluster. In some examples, at least one of the nodes in each data structure is associated with one or more of the other nodes in the respective data structure based on one or more of the one or more linguistic modalities and/or one or more of the rules from the rule database matched to the respective topic entities in the topic cluster. In some examples, the data structure constructed according method 100 is a knowledge graph. As such, the knowledge graph may comprise a plurality of nodes representing, for example, accounting, business, or financial concepts, and the nodes may be linked by linguistic modalities and/or rules from the rule database describing the relationship between the nodes, wherein the linguistic modalities are from the same input data as the entities forming the nodes, and wherein the rules are extracted from a database of rules.

Figure 6:
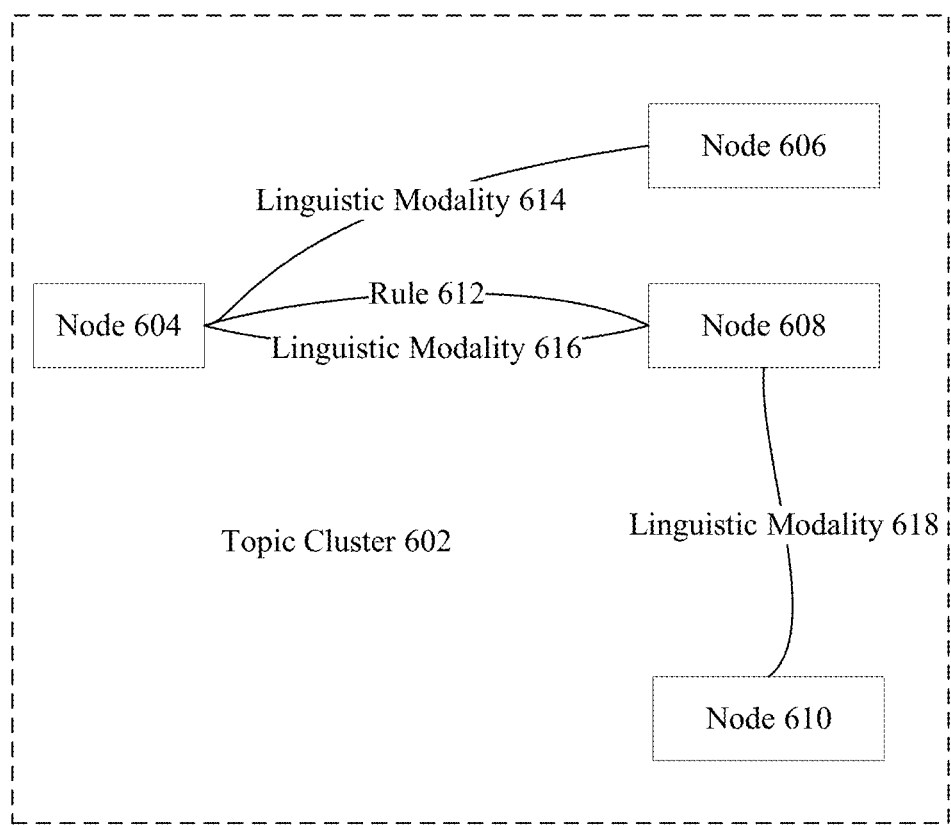
FIG. 6 illustrates an exemplary data structure constructed according to methods described herein.

In some examples, the data structure may resemble the illustrative data structure 600 depicted in FIG. 6. For instance, Node 604 may represent the topic entity "Goodwill," Node 606 may represent the topic entity "Amortization," and Node 608 may represent the topic entity "Tested for impairment.""Goodwill" and "Amortization" may be linked by Linguistic Modality 614 "not," which may have been identified as associated with the words/entities "goodwill" and "amortization" in the input data depicted in FIG. 7, indicating that goodwill is not amortized. "Goodwill" and "Tested for impairment" may be linked by the Rule 612 "have to," taken from the rule database rather than the text depicted in FIG. 7, indicating that goodwill has to be tested for impairment. As such, the data structure may comprise a plurality of nodes defined by topic entities extracted from input data, and the nodes may be linked by linguistic modalities also from the input data and/or rules from a rule database.

Figure 2:
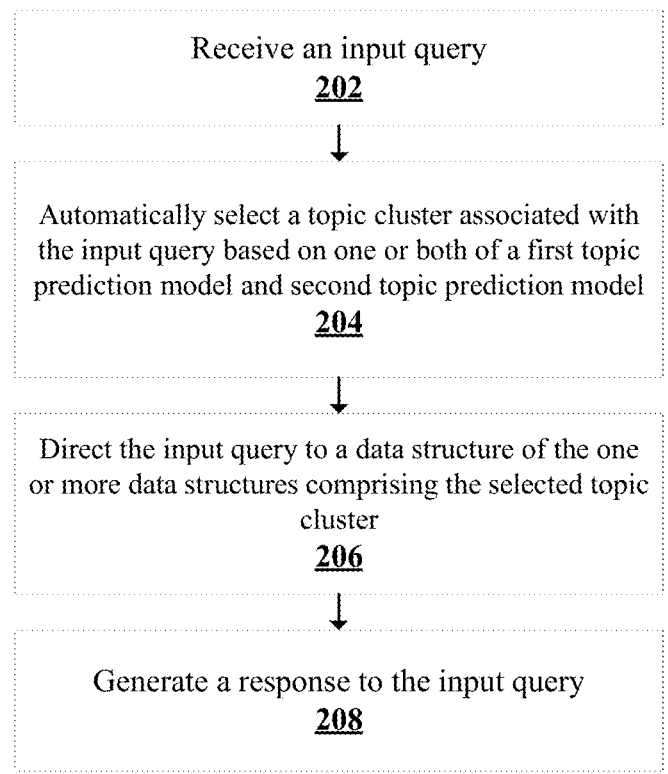
FIG. 2 illustrates an exemplary method for inferential reasoning using a data structure.

FIG. 2 illustrates an exemplary method for inferential reasoning using a data structure, for example, a data structure/knowledge graph constructed according to the method 100 set forth in FIG. 1. In some examples, the method 200 may begin at step 202 as depicted in FIG. 2, wherein step 202 includes receiving an input query. In some examples, the input query may be received from a user. In some examples, the input query may be extracted from a predefined set of questions and answers (e.g., a textual input comprising a multiple choice question). In some examples, the input query may be extracted from structured or unstructured textual data.

In some examples, after receiving an input query at step 202, the method 200 can proceed to step 204, wherein step 204 includes automatically selecting a topic cluster associated with the input query based on one or both of a first topic prediction model and second topic prediction model. In some examples, automatically selecting a topic cluster associated with the input query based on one or both of a first topic prediction model and second topic prediction model at step 204 may be accomplished in accordance with the method 500 illustrated in FIGS. 5A and 5B.

Figure 5A:
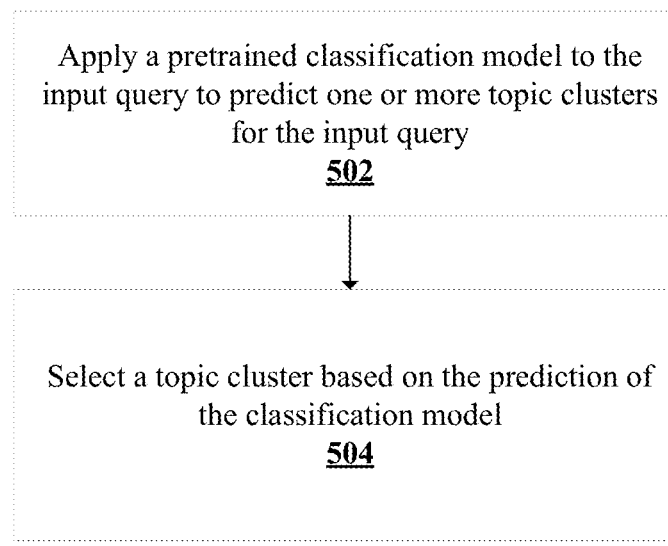
FIG. 5A illustrates an exemplary method for intention detection and result prediction.

In some examples, the method 500 may proceed according to the process illustrated in FIG. 5A, wherein the process illustrated in FIG. 5A comprises using a first prediction model, wherein the first prediction model is a pretrained classification model, to automatically identify a topic cluster associated with the input query. In some examples, the method 500 may begin at step 502, wherein step 502 comprises applying a trained classification model to the input query to predict one or more topic clusters associated with input query. In some examples, after predicting one or more topic clusters associated with the input query, the method 500 may proceed to step 504, wherein step 504 comprises selecting a predicted topic cluster based on the prediction of the classification model.

In some examples, the method 500 may proceed according to the process illustrated in FIG. 5B, wherein the process illustrated in FIG. 5B comprises using a second prediction model, wherein the second prediction model is a semantic embedding model, to automatically identify a topic cluster associated with the input query. In some examples, the method 500 may begin at step 506, wherein step 506 includes extracting a plurality of query entities (e.g., words, phrases, numbers, etc.) from the input query. In some examples, extracting the plurality of query entities may include applying a linguistic filtering process similar to the linguistic filtering process described with respect to step 104 of the method 100 to a plurality of entities extracted from the input query to identify a plurality of query entities from the plurality of extracted entities. In some examples, the query entities may be words or phrases associated with various accounting financial, and business concepts. The process for extracting query entities from the input file may, in some examples, be similar to the process for extracting topic entities from input data for constructing a data structure according to step 104 of the method 100.

After extracting a plurality of query entities from the input query at step 506, the method 500 may proceed to step 508, wherein step 508 includes applying a clustering process to generate one or more clusters of query entities. The clusters may comprise query entities associated with the same topic. After generating one or more clusters of query entities at step 508, the method 500 may proceed to step 510, wherein step 510 includes computing an average semantic embedding for one or more of the generated query entity clusters, each average semantic embedding representing a generated query entity cluster. After computing an average semantic embedding for one or more of the generated query entity clusters at step 510, the method 500 may proceed to step 512, wherein step 512 includes computing an average semantic embedding for one or more of the topic clusters, each average semantic embedding representing a topic cluster. After computing an average semantic embedding for one or more of the topic clusters at step 512, the method 500 may proceed to step 514, wherein step 514 includes selecting a topic cluster associated with the input query based on a comparison of at least one average semantic embedding representing a generated query entity cluster and at least one average semantic embedding representing a topic cluster.

In some examples, automatically selecting a topic cluster associated with the input query comprises selecting an optimal topic cluster based on a prediction by both the first and second topic prediction model. In other words, the first prediction model may predict an optimal topic cluster and the second prediction model may predict an optimal topic cluster, and the prediction of each model may be used to select an optimal topic cluster for the input query. In some examples, the method 500 may include predicting a topic cluster associated with the input query simultaneously using the first prediction model and second prediction model. In some examples, a topic cluster may be predicted using the first prediction model before the second prediction model, and in some examples, a topic cluster may be predicted using the second prediction model before the first prediction model.

In some examples, after automatically selecting a topic cluster associated with the input query based on one or both of a first topic prediction model and second topic prediction model at step 204, for instance, according to method 500, the method 200 may proceed to step 206, wherein step 206 includes directing the input query to a data structure of the one or more data structures comprising the selected topic cluster. After directing the input query to a data structure of the one or more data structures comprising the selected topic cluster at step 206, the method 200 may proceed to step 208, wherein step 208 includes generating a response to the input query using the data structure. In some examples, the generated response/answer may be selected from a predefined set of response/answer choices (e.g., a multiple-choice question) associated with the input query. As such, a system performing the method 200 may review each response/answer choice in a predefined set of response/answer choices and extract entities/keywords in the response/answer to compare to the nodes of the data structure. The system will then extract connections (e.g., linguistic modalities) from the responses/answers in the predefined set of responses/answers and compare to the connections between nodes in the data structure. Thus, if nodes and edges/connections corresponding to the entities and linguistic modalities extracted from the answer are found in the data structure, that response/answer may be assigned the highest score, indicating it is the correct response/answer.

In some examples, the response may be generated using the associated nodes of the data structure comprising the topic cluster to which the input query is directed without a predefined set of response/answer choices. As such, query entities/keywords from the input query may be matched to the closest data structure (e.g., using a pretrained classification model or semantic embedding model as described above). Using the nodes and connections linking nodes defining the data structure, the system may generate a response in sentence form using natural language generation (NLG). For instance, in response to an input query reciting "does goodwill need to be tested for impairment?" The system may identify a data structure with nodes "goodwill" and "tested for impairment," and "annually," and using the edges of the data structure defined by linguistic modalities and/or rules, generate the response "goodwill has to be tested for impairment annually." In some examples, the generated response may comprise a natural language description of an accounting topic. In some examples, the generated response may comprise a natural language description of a business entity. In some examples, the generated response may comprise a natural language description of an audit method. In some examples, the generated response may comprise a natural language description of a mathematical relationship. In some examples, the generated response may comprise a natural language explanation of the generated response to the input query.

In some examples, generating a response to the input query may comprise traversing between nodes of the data structure using the edges connecting the nodes and generating a response to the input query based on the traversed nodes and edges. For instance, after selecting a data structure based on the input query (e.g., using the pretrained classification model or semantic embedding model) a response may be generated by traversing between a first node and a second node of the data structure using an edge connecting the first and second node. For example, the first node may represent the topic entity "goodwill," the second node may represent the topic entity "amortization," and the edge linking the first and second node may be linguistic modality "not." As such, the predicted answer generated by traversing between the first and second node may be "Goodwill is not amortized."

In an additional example of generating a response to an input query, an input query may be "X Company pays $10 million for all outstanding shares of Y Company. On the date of the purchase, Y Company has net identifiable assets with a book value of $8 million and a fair value of $8.5 million. Which of the following statements are true?" According to steps 114 through 120 of the method 100, upon receiving the input query, the input query may be directed to the topic cluster "business combination and intangible asset valuation" after identifying that topic cluster as associated with the input query based on one or both of the first topic prediction model and second topic prediction model. Based on the data structure comprising the respective topic cluster, a response to the input query may be generated. For instance, the response to the above input query may be "goodwill of $1.5 million should be reported for consolidation purposes and tested annually for impairment."

The generated response may be in the form of a text file, an audio file, a digital display, or any other form capable of conveying the generated response to the input query to a user.

FIG. 6 illustrates an exemplary data structure constructed according to the systems and methods disclosed herein. According to some examples, the exemplary data structure 600 comprises a topic cluster 602. In some examples, the topic cluster is associated with a topic area related to, for instance, accounting, business, or finance. For instance, in the embodiment illustrated in FIG. 6, the topic cluster may be related to the topic area of "business combination and intangible asset valuation." The topic area may, however, be any other topic area and is not limited to topics related to accounting, business, or finance.

In one or more examples, the topic cluster 602 comprises a plurality of nodes 604, 606, 608, and 610. Each of the plurality of nodes may be linked to one or more of the other nodes in the topic cluster by one or more linguistic modalities 614, 616, and 618 and/or one or more rules 612. For example, and as shown in FIG. 606, node 604 is linked to node 606 by linguistic modality 614. Node 604 is further linked to node 608 by linguistic modality 616 and rule 612, and node 608 is linked to node 610 by linguistic modality 618. In some examples, the nodes 604, 606, 608, and 610 each represent a respective topic entity related to, for example, accounting, finance, or business. For instance, nodes 604, 606, 608, and 610 may be "goodwill,""amortization," "test for impairment," and "annual," respectively. In some examples, the linguistic modalities linking the nodes may represent logical relationships between the plurality of nodes. In some examples, the linguistic modalities may be deontic or epistemic modalities. For example, linguistic modalities 614 and 616 may be "not" and "have to," respectively.

In some examples, the rules linking the nodes may represent relationships between the nodes defined by one or more regulatory or compliance rules (e.g., accounting, business, or finance regulatory or compliance rules) from a rule data base. The rules may be regulatory or compliance rules from a rule database matched with the respective topic cluster as described above according to the method 100. The data structure illustrated in FIG. 6 may be constructed according to the method 100 described above with reference to FIG. 1.

Figure 8:
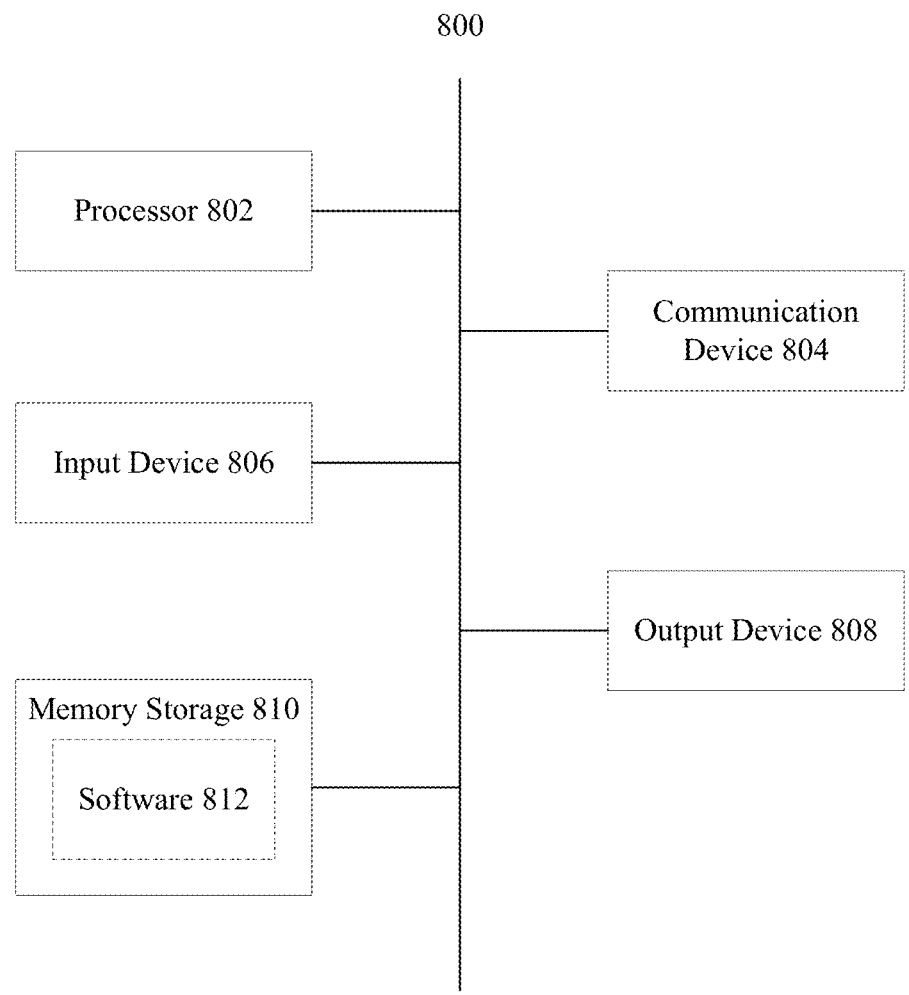
FIG. 8 illustrates an exemplary electronic device, in accordance with some examples.

FIG. 8 depicts an exemplary computing device 800, in accordance with one or more examples of the disclosure. Device 800 can be a host computer connected to a network. Device 800 can be a client computer or a server. As shown in FIG. 8, device 800 can be any suitable type of microprocessor-based device, such as a personal computer, workstation, server, or handheld computing device (portable electronic device) such as a phone or tablet. The device can include, for example, one or more of processors 802, input device 806, output device 808, storage 810, and communication device 804. Input device 806 and output device 808 can generally correspond to those described above and can either be connectable or integrated with the computer.

Input device 806 can be any suitable device that provides input, such as a touch screen, keyboard or keypad, mouse, or voice-recognition device. Output device 808 can be any suitable device that provides output, such as a touch screen, haptics device, or speaker.

Storage 810 can be any suitable device that provides storage, such as an electrical, magnetic, or optical memory, including a RAM, cache, hard drive, or removable storage disk. Communication device 804 can include any suitable device capable of transmitting and receiving signals over a network, such as a network interface chip or device. The components of the computer can be connected in any suitable manner, such as via a physical bus or wirelessly.

Software 812, which can be stored in storage 810 and executed by processor 802, can include, for example, the programming that embodies the functionality of the present disclosure (e.g., as embodied in the devices as described above).

Software 812 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 810, that can contain or store programming for use by or in connection with an instruction execution system, apparatus, or device.

Software 812 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 812 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A system for constructing a data structure, the system comprising one or more processors configured to cause the system to:
   receive input data;
   extract a plurality of topic entities from the input data;
   group one or more topic entities of the plurality of topic entities into one or more topic clusters;
   identify one or more linguistic modalities associated in the input data with one or more of the plurality of topic entities;
   for a first topic cluster of the one or more topic clusters, construct a data structure comprising a plurality of nodes, wherein each node of the data structure respectively represents a topic entity extracted from the input data and grouped into the first topic cluster, and wherein a first node of the data structure is associated with a second node of the data structure based on the first node and the second node respectively representing a first topic entity and a second topic entity associated in the input data with a common one of the one or more identified linguistic modalities;
   construct a plurality of data structures, each data structure comprising a plurality of nodes included in a respective topic cluster of the one or more topic clusters, wherein each of the nodes of each respective data structure represents a respective topic entity grouped into the respective topic cluster, and wherein nodes within each of the plurality of data structures are interconnected based on the respective topic entities represented by the nodes being associated in the input data with common identified linguistic modalities;

cause the system to automatically generate a response to an input query using a selected data structure of the plurality of data structures, wherein automatically generating a response to the input query comprises:
receiving an input query;
automatically identifying a topic cluster associated with the input query based on one or both of a first topic prediction model and second topic prediction model;
directing the input query to the selected data structure of the plurality of data structures based on the selected data structure being associated with the identified topic cluster; and
generating a response to the input query based on the data structure comprising the identified topic cluster.

2. The system of claim 1, wherein the input data comprises a natural language input.

3. The system of claim 1, wherein the plurality of topic entities comprise accounting keywords in the input data.

4. The system of claim 1, wherein the linguistic modalities comprise deontic and/or epistemic linguistic modalities.

5. The system of claim 1, wherein the data structure is a knowledge graph.

6. The system of claim 1, wherein a plurality of nodes in the data structure, in addition to the first node and the second node, are interconnected based on the respective topic entities represented by the plurality of nodes being associated in the input data with common identified linguistic modalities.

7. The system of claim 1, wherein the one or more processors are configured to cause the system to match one or more topic entities in the one or more topic clusters with one or more rules from a rule database based on a relationship between the one or more topic entities and the one or more rules.

8. The system of claim 7, wherein the relationship between the one or more topic entities and the one or more rules is determined using one or both of a term frequency inverse document frequency matching process and an average semantic embedding matrix matching process.

9. The system of claim 7, wherein the first node of the data structure is associated with the second node of the data structure based on the first node and the second node having been matched to the same rule from the rule database.

10. The system of claim 1, wherein the input query is a natural language input.

11. The system of claim 1, wherein the first prediction model is a trained semantic classification model and the second prediction model is a semantic embedding model.

12. The system of claim 1, wherein generating a response to the input query comprises selecting, based on the data structure comprising the identified topic cluster, a response from a predefined group of responses.

13. The system of claim 1, wherein generating a response to the input query comprises generating, using the interconnected nodes of the data structure, a response to the input query.

14. The system of claim 1, wherein the generated response comprises a natural language description of an accounting topic.

15. The system of claim 1, wherein the generated response comprises a natural language description of a business entity.

16. The system of claim 1, wherein the generated response comprises a natural language description of an audit method.

17. The system of claim 1, wherein the generated response comprises a natural language explanation of the generated response to the input query.

18. A method for constructing a data structure, the method comprising:
receiving input data;
extracting a plurality of topic entities from the input data;
grouping one or more topic entities of the plurality of topic entities into one or more topic clusters;
identifying one or more linguistic modalities associated in the input data with one or more of the plurality of topic entities;
for a first topic cluster of the one or more topic clusters, constructing a data structure comprising a plurality of nodes, wherein each node of the data structure respectively represents a topic entity extracted from the input data and grouped into the first topic cluster, and wherein a first node of the data structure is associated with a second node of the data structure based on the first node and the second node respectively representing a first topic entity and a second topic entity associated in the input data with a common one of the one or more identified linguistic modalities;
construct a plurality of data structures, each data structure comprising a plurality of nodes included in a respective topic cluster of the one or more topic clusters, wherein each of the nodes of each respective data structure represents a respective topic entity grouped into the respective topic cluster, and wherein nodes within each of the plurality of data structures are interconnected based on the respective topic entities represented by the nodes being associated in the input data with common identified linguistic modalities;
automatically generating a response to an input query using a selected data structure of the plurality of data structures, wherein automatically generating a response to the input query comprises:
receiving an input query;
automatically identifying a topic cluster associated with the input query based on one or both of a first topic prediction model and second topic prediction model;
directing the input query to the selected data structure of the plurality of data structures based on the selected data structure being associated with the identified topic cluster; and
generating a response to the input query based on the data structure comprising the identified topic cluster.

19. A non-transitory computer readable storage medium storing one or more programs, the one or more programs comprising instructions, which when executed by one or more processors of an electronic device, cause the electronic device to:
receive input data;
extract a plurality of topic entities from the input data;
group one or more topic entities of the plurality of topic entities into one or more topic clusters;
identify one or more linguistic modalities associated in the input data with one or more of the plurality of topic entities;
for a first topic cluster of the one or more topic clusters, construct a data structure comprising a plurality of nodes, wherein each node of the data structure respectively represents a topic entity extracted from the input data and grouped into the first topic cluster, and wherein a first node of the data structure is associated with a second node of the data structure based on the first node and the second node respectively representing a first topic entity and a second topic entity associated in the input data with a common one of the one or more identified linguistic modalities;

construct a plurality of data structures, each data structure comprising a plurality of nodes included in a respective topic cluster of the one or more topic clusters, wherein each of the nodes of each respective data structure represents a respective topic entity grouped into the respective topic cluster, and wherein nodes within each of the plurality of data structures are interconnected based on the respective topic entities represented by the nodes being associated in the input data with common identified linguistic modalities;

cause the system to automatically generate a response to an input query using a selected data structure of the plurality of data structures, wherein automatically generating a response to the input query comprises:

receiving an input query;

automatically identifying a topic cluster associated with the input query based on one or both of a first topic prediction model and second topic prediction model;

directing the input query to the selected data structure of the plurality of data structures based on the selected data structure being associated with the identified topic cluster; and generating a response to the input query based on the data structure comprising the identified topic cluster.

* * * * *